June 12, 1945.  W. A. McCOOL  2,377,894
AUTOMATIC CONTROL FOR LOCKED OSCILLATORS
Filed May 9, 1942  3 Sheets-Sheet 1
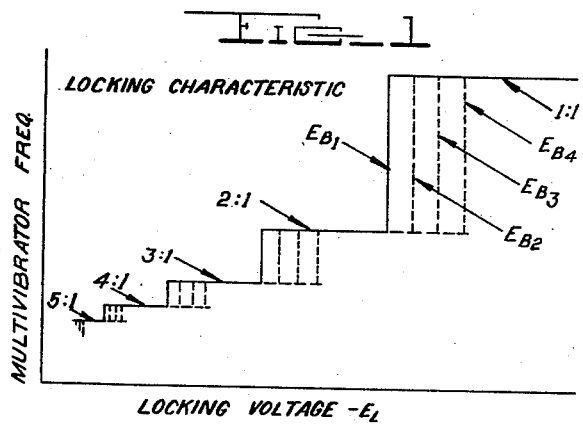
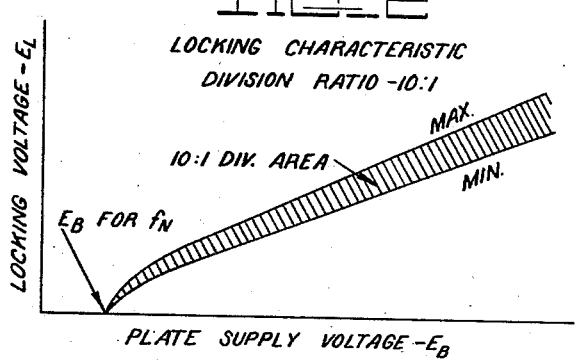
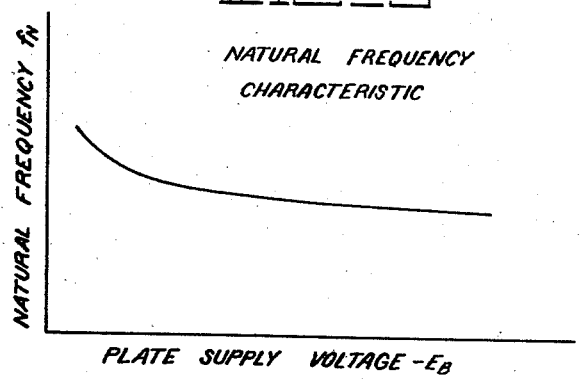
Inventor
William A. McCool
By
Attorney June 12, 1945.  W. A. McCOOL  2,377,894
AUTOMATIC CONTROL FOR LOCKED OSCILLATORS
Filed May 9, 1942  3 Sheets-Sheet 2
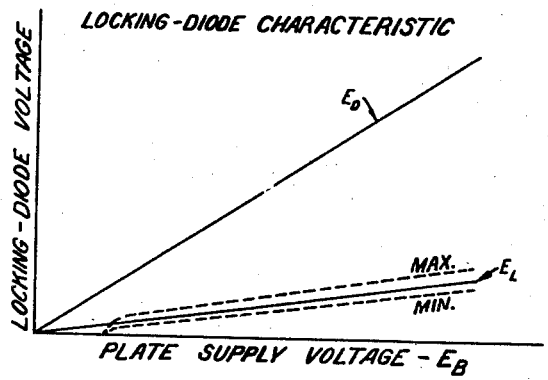
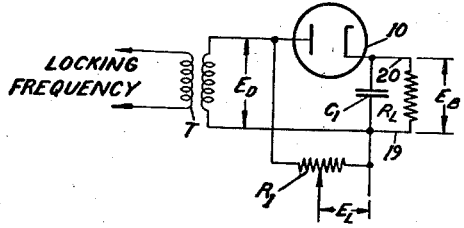
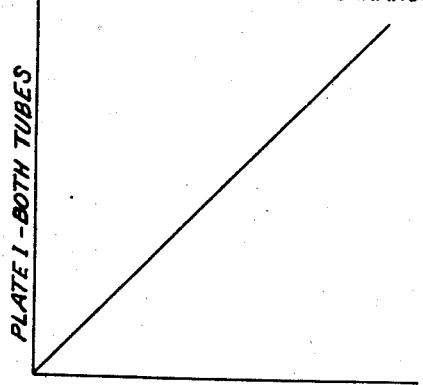
Inventor
William A. McCool
By
Attorney

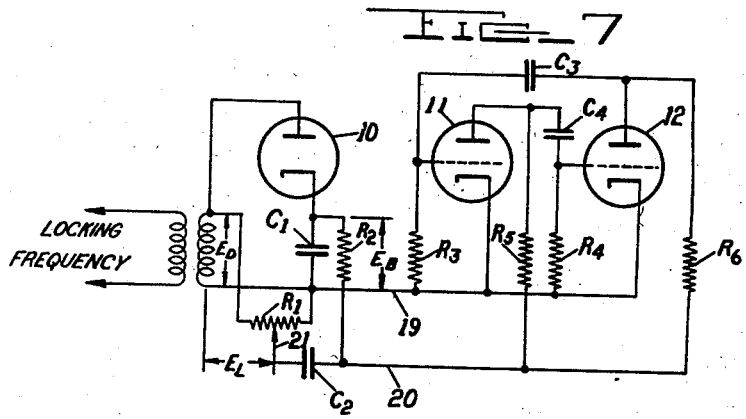
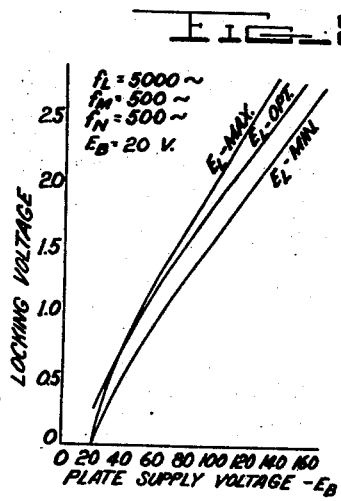
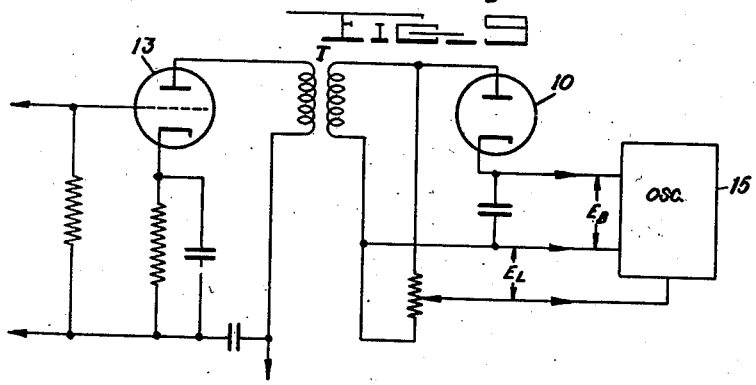

Patented June 12, 1945

2,377,894

UNITED STATES PATENT OFFICE 2,377,894

AUTOMATIC CONTROL FOR LOCKED OSCILLATORS

William A. McCool, Washington, D. C.

Application May 9, 1942, Serial No. 442,340

6 Claims. (Cl. 250—36)

(Granted under the act of March 3, 1883, as amended April 30, 1928; 370 O. G. 757)

This invention relates to a method and means for increasing the stability of multivibrators and more particularly to a method and means which render the multivibrator output frequency independent of variations of locking voltage amplitude over a wide range of such variations. While directed particularly to multivibrators, the invention is applicable to other types of oscillators.

A multivibrator consists essentially of a two-stage resistance coupled amplifier whose output is capacitatively coupled to its input. Oscillations are sustained in this arrangement because a 180° phase shift is produced in each tube thereby setting up the exact phase relationship for complete regeneration. The natural frequency of oscillation is determined primarily by the coupling capacitors and the grid leak resistances and it is also influenced to a much lesser degree by the tube characteristics, the electrode voltages and the remaining circuit constants.

Multivibrators have been used for years in frequency measuring applications where successive division of the standard frequency is necessary. Their highly distorted wave form is especially useful for harmonic generation. In recent years they have been employed in television for the generation of locked sweep frequencies, and are well suited for other applications in highly specialized types of radio equipment. When used as frequency dividers the frequency of oscillation is a sub-multiple of the controlling or locking voltage frequency. Division ratios of 50 to 1 have been attained but a ratio of 10 to 1 has heretofore been a sound practical limit. The oscillation frequency limits are consistent with those of resistance coupled amplifiers.

The most common source of trouble heretofore encountered in the use of multi-vibrators is complete failure or variation in locking voltage. Since the division ratio is a function of locking voltage amplitude, as will be shown later, it follows that a failure or a variation in the locking voltage will usually produce a change in division ratio. This is of course an undesirable effect. In some frequency measuring applications where many frequencies are derived from a standard source such as a crystal, multivibrators are used in cascade. For example, 10,000 cycles, 1,000 cycles, 100 cycles and 10 cycles may be derived from a 100 kc. crystal and locked with it. In this case the crystal controls a 10,000 cycle multivibrator which in turn controls a 1000 cycle multivibrator and so on. If any one unit loses control the remaining units on the low frequency side usually lock together in some random harmonic relationship. Such failures are not uncommon and are highly undesirable.

Other types of oscillators are also subject to defects of a similar nature. Such oscillators possess locking characteristics similar to those of multivibrators. In such cases, when the locking voltage amplitude variation exceeds a certain range the oscillator will take up some random frequency of oscillation. In certain applications, the use of a type of locked oscillator other than a multivibrator becomes desirable. The invention may readily be used in controlling the locking of such oscillators.

It is therefore an object of this invention to provide a method and means for rendering the output frequency of a multivibrator or other oscillator independent of variations in locking voltage amplitude over a wide range of such variation and for rendering cessation of operation in the complete absence of locking voltage.

It is a further object of this invention to control the stability of a multivibrator or other oscillator by rendering the locking voltage amplitude directly proportional to the plate supply voltage.

It is another object of this invention to control the stability of a multivibrator or other oscillator by varying the amplitude of the plate supply voltage as a linear function of the locking voltage amplitude.

It is still another object of this invention to provide a method and means for deriving the plate supply voltage of a multivibrator or other oscillator from the source of the locking voltage applied thereto.

Other objects of this invention will become apparent from a careful consideration of the following description when taken together with the accompanying drawings in which:

Fig. 1 is a graph showing the relationship between the multivibrator output frequency and locking voltage amplitude;

Fig. 2 is a graph showing the relationship between locking voltage and plate supply voltage for a particular division ratio;

Fig. 3 is a graph showing the natural frequency characteristic of a multivibrator;

Fig. 4 is a graph showing a desired curve of relationship between locking voltage amplitude and plate supply amplitude, and a diode characteristic curve;

Fig. 5 is a circuit diagram of a portion of a circuit from which is derived according to the invention, multivibrator locking voltage and plate supply voltage;

Fig. 6 is a graph showing the multivibrator load characteristic;

Fig. 7 is a circuit diagram of a multivibrator system embodying the invention;

Fig. 8 is a graph showing the experimental locking voltage characteristic of the circuit of Fig. 7, and Fig. 9 is a circuit diagram of a modification of the circuit of Fig. 7, showing the application of the invention to oscillators in general.

Referring now to Fig. 1 in which is shown variations in multivibrator output frequency for various conditions of locking voltage and plate supply voltage, it will be noted that with plate voltage constant the output frequency of the multivibrator varies with variations in locking voltage amplitude in a series of discrete steps, the frequency of each step bearing an integral proportionality to the locking voltage frequency. It should be noted that the maximum frequency limit is the frequency of the locking voltage and the minimum frequency is the natural frequency of the multivibrator. Fig. 1 shows four curves each drawn for a different value of plate supply voltage. These curves are marked $E_{B1}$, $E_{B2}$, $E_{B3}$ and $E_{B4}$. Thus, from this figure it will be seen that not only does the multivibrator output frequency vary with variations in locking voltage amplitude through a series of discrete steps, each frequency bearing an integral ratio to the locking voltage frequency, but that the point at which each of these steps occurs with respect to locking voltage amplitude varies with plate supply voltage amplitude.

Fig. 2 shows for a given division ratio the permissible variation in locking voltage for various values of plate supply voltage. The maximum and minimum locking voltage amplitudes used in this graph are taken directly from a family of curves similar to that shown in Fig. 1 for a division ratio of 10 to 1. This plot results in two spaced and almost parallel curves which are linear over most of the plate voltage range. For any particular value of plate supply voltage the ultimate distance between the two curves defines the limits of locking voltage amplitude. As the division ratio is increased these curves will fall nearer each other indicating that the permissible limits of the locking voltage are becoming more restricted. Thus the critical adjustment of the conventional multivibrator is graphically indicated. In Fig. 2 it will be observed that the maximum and minimum curves converge at zero locking voltage and a low value of plate supply voltage. The point of convergence defines the plate voltage at which the natural frequency is coincident with the initial multivibrator controlled frequency.

The effect of plate supply voltage on the natural frequency of the multivibrator is shown by the curve in Fig. 3.

This invention is based upon the relationship between plate supply voltage and locking voltage amplitudes illustrated in Fig. 2. It contemplates making the locking voltage amplitude directly proportional to the plate supply voltage so that any change of the latter will produce a linear variation of the former. The ratio of these voltages is adjusted so that the locking voltage curve falls midway between the maximum and minimum curves. Such a curve is illustrated in Fig. 4, the locking voltage curve being designated $E_L$. Fulfillment of this condition results in several distinct and striking advantages; first, the range of locking voltage amplitude for a given division ratio is tremendously expanded; second, with both voltages approaching zero as indicated in Fig. 4 the absence of locking voltage precludes uncontrolled oscillation. It will be noted that the projected voltage characteristic intersects the maximum curve at a very low plate voltage which is slightly more than the value for the natural frequency of the given circuit constants. This intersection establishes the minimum of the range of stable operation. It can be seen from the curves that this minimum may be extended by a choice of circuit constants which will determine the same natural frequency (equal to the operating frequency) at a lower plate supply voltage. The practical limit of minimum plate voltage is 7 to 10 volts; the minimum for stable operation of the multi-vibrator is somewhat greater, the extent being determined principally by the division ratio.

Due to the linearity of each curve and the similarity of their respective slopes the curves of Fig. 4 do not indicate a maximum point of stable operation. Obviously, however, a maximum point exists at a higher plate supply voltage which is in excess of the highest practical limit.

Fig. 5 illustrates one practical means by which the inter-relationship of locking voltage and plate supply voltage necessary to produce the results of Fig. 4 can be obtained. In this circuit a voltage $E_D$ having the desired locking frequency is impressed across a diode 10 by means of a transformer T across the secondary of which is connected a variable resistance $R_1$. The D. C. output of the diode may be taken across the capacitor $C_1$. In such a circuit the D. C. output voltage is directly proportional to the A. C. voltage applied if the load resistance is much greater than the plate resistance and if the time constant of $R_2$ and $C_1$ is much greater than the frequency of the A. C. voltage. These conditions are quite feasible in practical application.

The voltage divider comprising the variable resistance $R_1$ connected across the signal source provides locking voltage having any desired amplitude. From Fig. 4, which also shows the diode characteristic $E_D$, it is obvious that all three parameters $E_B$, $E_L$ and $E_D$ are in linear relationship. Thus the desired relationship of direct proportionality between the locking voltage amplitude and the plate supply voltage is attained.

There remains the problem of the successful application to the multivibrator of the voltages available from the diode circuit. The injection of the locking voltage can be accomplished by several different arrangements, one of which is illustrated in Fig. 7. The D. C. load presented by the multivibrator can be substituted directly for the diode load if the former is essentially constant over a complete cycle and over the plate voltage range.

Fig. 6 illustrates the multivibrator load characteristic which, as can be seen, is practically linear. From a study of the conventional multivibrator characteristics it can be seen that the total plate current drain is constant over a cycle, since the tubes operate 180° out of phase. Aside from the phase displacement the plate current-time characteristic of each tube is exactly alike. When the circuit constants are symmetrical the actual value of the load then is almost equal to the plate load resistance of one tube if the latter is considerably larger than the normal plate resistance.

Fig. 7 shows the complete circuit of a stabilized multivibrator embodying the invention. The multivibrator comprises two triodes 11 and 12, the plate of each being coupled to the grid of the other tube through symmetrically chosen capacitors $C_3$ and $C_4$. The grid resistors $R_3$ and $R_4$ are symmetrical as are the plate resistors $R_5$ and $R_6$ which are selected to have a value considerably larger than that of the plate resistance. Input leads 19 and 20 are connected across the diode output for the application of plate voltage $E_B$ to the multivibrator. Voltage dropping resistor $R_2$ is inserted in 20 for locking voltage injection. A blocking condenser $C_2$ is employed in the lead 20.

A typical circuit of the type shown in Fig. 7 employs a natural frequency of 500 cycles with the plate supply voltage of 20 volts, a locking voltage frequency of 5000 cycles and a division ratio of 10 to 1. A type 6SN7GT tube containing two triodes having low plate resistance has been found satisfactory. A 6H6 type tube may be used for the diode and the following values for the various elements of the circuit will be found satisfactory. $C_1=16\mu f$, $C_2=.1\mu f$, $C_3$ and $C_4$ $.0021\mu f$, $R_1$ and $R_2$ 10,000 ohms, $R_3$ and $R_4$ 360,000 ohms, and $R_5$ and $R_6$ 100,000 ohms.

Fig. 8 shows the operating characteristic obtained from a system constructed in accordance with Fig. 7 and employing the values listed above. The maximum and minimum curves indicate the limits of the locking voltage amplitude against the plate supply voltage. The optimum curve shows the operating characteristic for the best fixed adjustment of locking voltage. The latter curve is also the diode characteristic with the multivibrator load. It should be noted that this curve is not quite linear. This is due to the fact that even though the plate load resistors $R_5$ and $R_6$ represent the dominant portion of the diode load, the plate resistance of a triode increases rapidly with decreasing plate voltages of a small order. Since the D. C. load in any half-cycle of the operating frequency consists of the plate load resistance in series with the plate resistance of one tube, there is a substantial net increase when the latter increases to values comparable to the former.

It will be noted that the curves of Fig. 8 satisfy the requirements of Fig. 4 and that the conventional multivibrator characteristic as illustrated in Fig. 2 has not been altered in the least. The optimum curve approaches linearity and intersects the maximum curve at a low plate voltage of slightly more than 20 volts. The maximum and minimum curves converge at zero locking volts and 20 plate volts. Furthermore, the multivibrator is inoperative in the absence of locking voltage. It is not dependent on an external plate voltage supply, and drifting tube characteristics are reduced to a point of negligible effect with proper design.

However, there are minor disadvantages which can be minimized but not completely eliminated. First, a small amount of power is required from the signal source to operate the system. A system constructed using the values listed above requires approximately 100 milliwatts to maintain an effective plate voltage of 100 volts. This is not excessive but under certain circumstances will present impedance matching problems. In this case the effective diode input impedance is approximately 50,000 ohms. In general it may be said that the input impedance is equal to ½ the total static load of one multivibrator tube with proper design. When locking frequencies of 20 kc. or less are used, a 6J5 type tube may be used as an amplifier in conjunction with a 2 to 1 step-up transformer if no selectivity is desired. Such a combination is shown in Fig. 9 in which tube 13 feeds into transformer T which is coupled to the diode 10. It must be remembered that a low resistance D. C. return for the diode is always necessary. The unstable region between zero and minimum plate voltage may at times constitute another disadvantage. In a system employing the above listed circuit values this region extends from zero to 20 volts of signal voltage. Considering the wide range of operation available above the minimum and the improvement over pre-existing types, this is normally not objectionable. However, where the ultimate in reliability is desired, this defect may readily be eliminated by a conventional relay device employed to prevent operation of the multivibrator below a predetermined minimum locking voltage which, in this case, could be chosen as 30 volts input to the diode. A typical relay which has been satisfactorily tested for this purpose is of an electronic nature employing a thyratron for control. This arrangement has been found to be very reliable. In most cases, however, such an elaboration of the stabilized multivibrator is not warranted.

The vastly increased stability provided by the invention makes possible the practical accomplishment of higher division ratios. By employing the invention ratios as high as 20 to 1 may be attained with a corresponding increase in stability over the conventional multivibrator of the same frequency. Naturally, all the factors affecting instability will become more pronounced at such ratios and the operating range of input voltage will be materially decreased.

Fig. 9 also shows the application of the invention to oscillators in general, the oscillator being indicated by the reference character 15. The circuit connections between the diode and the oscillator are similar to those of Fig. 7.

The invention should not be considered restricted to the embodiments disclosed herein, since many other arangements coming within the scope of the invention as defined by the appended claims may be employed.

The invention described herein may be manufactured and used by or for the Government of the United States of America for governmental purposes without the payment of any royalties thereon or therefor.

I claim:

1. Means for stably locking the output frequency of a free-running relaxation oscillator at a fixed integral ratio with respect to the frequency of a locking voltage for a wide range of amplitude variation of said locking voltage, by establishing and maintaining a fixed amplitude ratio between the plate voltage applied thereto and said locking voltage, comprising a locking circuit for said oscillator, a rectifier and filter, means coupling an alternating current voltage having the desired locking frequency across the input to said rectifier, means applying the output of said rectifier through said filter and said locking circuit to said oscillator as plate voltage, means applying said alternating current voltage through said locking circuit to said oscillator as locking voltage and means adjusting the ratio of said plate voltage to said locking voltage applied through said locking circuit.

2. Means for stably locking the output frequency of a free-running relaxation oscillator at a fixed integral ratio with respect to the frequency of a locking voltage for a wide range of amplitude variation of said locking voltage, by establishing and maintaining a fixed amplitude ratio between the plate voltage applied thereto and said locking voltage, comprising a locking circuit for said oscillator, a rectifier and filter, means impressing an alternating current voltage having the desired locking frequency across the input to said rectifier, means applying the output of said rectifier through said filter and said locking circuit to said oscillator as plate voltage, and means applying said alternating current voltage through said locking circuit to said oscillator as locking voltage.

3. Means for stably locking the output frequency of a free-running relaxation oscillator at a fixed integral ratio with respect to the frequency of a locking voltage for a wide range of amplitude variation of said locking voltage, by establishing and maintaining a fixed amplitude ratio between the plate voltage applied thereto and said locking voltage, comprising a source of alternating current voltage having the desired locking frequency, means deriving from said alternating current voltage a direct current voltage having an amplitude proportional to the amplitude of said alternating current voltage, means filtering said direct current voltage and applying it to said oscillator as plate voltage and means applying said alternating current voltage to said oscillator as locking voltage.

4. A method of stably locking the output frequency of a free-running relaxation oscillator at a fixed integral ratio with respect to the frequency of a locking voltage for a wide range of amplitude variation of said locking voltage by establishing and maintaining a fixed amplitude ratio between the plate voltage applied thereto and said locking voltage, which comprises deriving from a common source an alternating current voltage and a direct current voltage, applying said direct current voltage to said oscillator as plate voltage and applying said alternating current voltage to said oscillator as locking voltage.

5. A method of stably locking the output frequency of a free-running relaxation oscillator at a fixed integral ratio with respect to the frequency of a locking voltage for a wide range of amplitude variation of said locking voltage by establishing and maintaining a fixed amplitude ratio between the plate voltage applied thereto and said locking voltage, which comprises rectifying and filtering an alternating current voltage having the desired locking frequency, applying said alternating current voltage to said oscillator as locking voltage and applying said rectified and filtered voltage to said oscillator as plate voltage.

6. A method of stably locking the output frequency of a free-running relaxation oscillator at a fixed integral ratio with respect to the frequency of a locking voltage for a wide range of amplitude variation of said locking voltage, which comprises varying the amplitude of the plate supply voltage of said oscillator as a linear function of the amplitude of said locking voltage over said range of variation and applying said locking voltage to said free-running oscillator to determine the frequency thereof.

WILLIAM A. McCOOL.